United States Patent [19]

Cipelletti et al.

[11] Patent Number: 5,673,194
[45] Date of Patent: Sep. 30, 1997

[54] RECORDING SYSTEM FOR A PRODUCTION LINE

[75] Inventors: Marco Cipelletti; Orlando Pasti, both of Pavia, Italy

[73] Assignee: Marelli Autronica S.p.A., Italy

[21] Appl. No.: 334,152

[22] Filed: Nov. 4, 1994

[30] Foreign Application Priority Data

Nov. 5, 1993 [IT] Italy .................................. TO93A0838

[51] Int. Cl.$^6$ ........................................................ G06F 19/00
[52] U.S. Cl. .............................. 364/468.22; 364/468.16
[58] Field of Search ................................ 364/468, 478, 364/470, 401, 402, 552, 474.11, 468.01, 468.02–468.24, 468.28, 470.01, 470.07, 478.03, 478.13, 478.14, 478.15, 132; 235/375

[56] References Cited

U.S. PATENT DOCUMENTS

| | | | |
|---|---|---|---|
| 4,027,246 | 5/1977 | Caccoma et al. | 235/151.1 |
| 4,251,858 | 2/1981 | Cambigue et al. | 364/474.11 |
| 4,408,291 | 10/1983 | Gunzberg et al. | 364/468 |
| 4,819,176 | 4/1989 | Ahmed et al. | 364/468 |
| 4,974,166 | 11/1990 | Maney et al. | 364/478 |
| 5,056,028 | 10/1991 | Ohta et al. | 364/468 |
| 5,396,432 | 3/1995 | Saka et al. | 364/468 |

FOREIGN PATENT DOCUMENTS

| | | | |
|---|---|---|---|
| 0 142 436 | 5/1985 | European Pat. Off. | G06K 19/06 |
| 2 239 235 | 6/1991 | United Kingdom | G05B 19/417 |

*Primary Examiner*—Reba I. Elmore
*Assistant Examiner*—Steven R. Garland
*Attorney, Agent, or Firm*—Edward D. Manzo; Mark J. Murphy

[57] ABSTRACT

A data-collection and monitoring system for a production line ensures the traceability, that is, the detailed reconstruction, of the entire production process for each finished product output by the line, by the separate filing of data relating to the manufacturing steps and to the products, with the use of time as the unifying factor. The system advantageously provides for the two sets of data to be correlated only when necessary, permitting considerable savings in both hardware and software requirements.

34 Claims, 1 Drawing Sheet

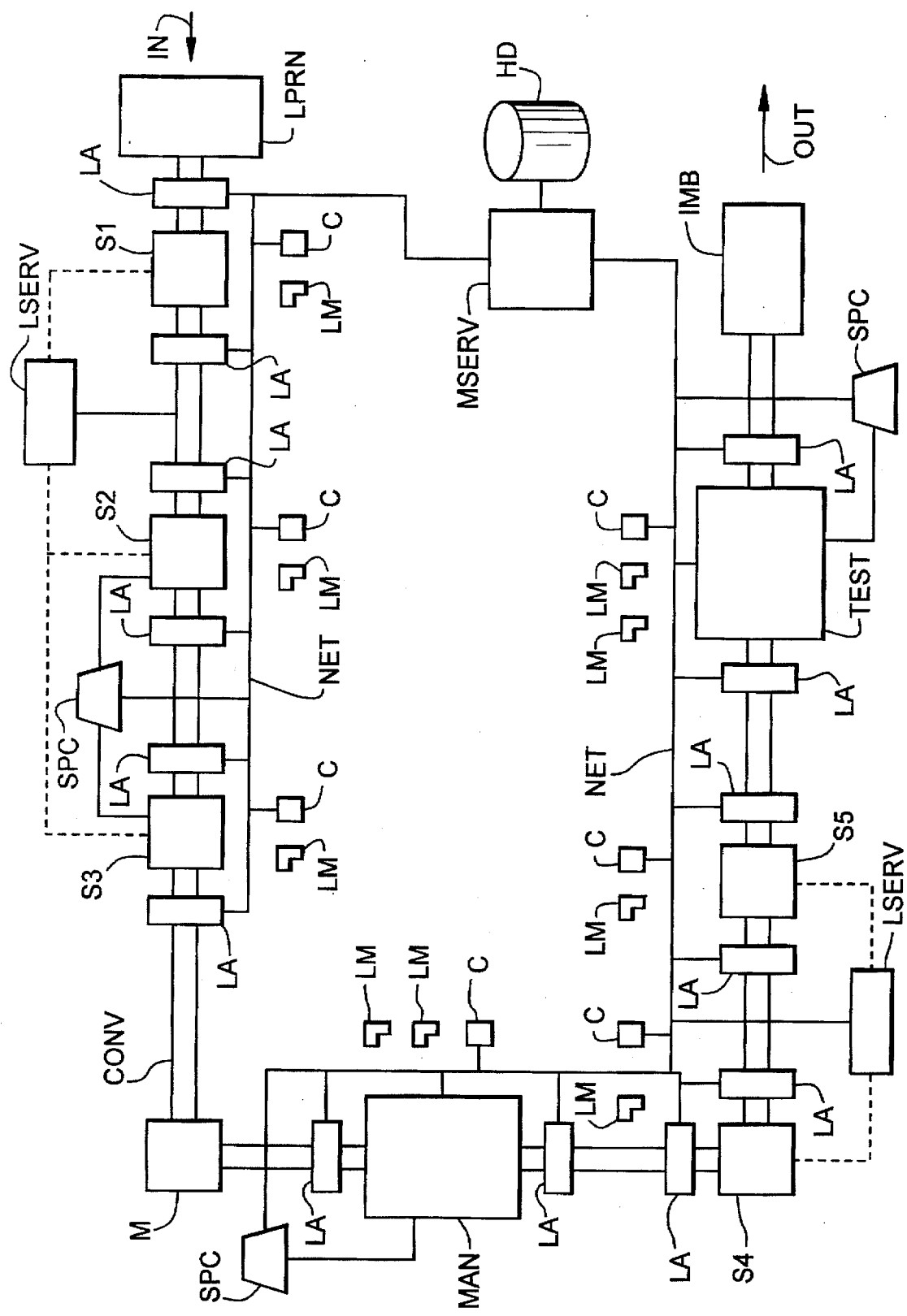

RECORDING SYSTEM FOR A PRODUCTION LINE

BACKGROUND OF THE INVENTION

The present invention relates in general to data-collection systems associated with industrial production lines and, more specifically, to a data-collection system which ensures the traceability of the products of an industrial line.

The English term "traceability" means the ability to reconstruct the entire production process for each finished product output by the production line, i.e., to identify all the components making up the finished product, and their origin, as well as all the manufacturing steps which the finished product has undergone, with their operating conditions.

The importance of the use of a system of this type in current industrial production lines is clear, particularly as far as the operations affecting the reliability and quality of the products are concerned.

According to the prior art, a system which performs these functions may be implemented, for example, by recording all the data relating to the production conditions of each product passing along the production line during production. The recording may take place in a database of known type, for example, a relational database. Whilst this solution has the merit of being essentially simple, practically it is not feasible.

In fact, the quantity of data to be recorded in order to control data relating to each individual product of a modern industrial production line is typically of the order of several millions of crude data, such as, for example, identification codes, per day. Such a quantity of data causes the cost of the hardware and software necessary for collection and subsequent retrieval to become prohibitive if compared with the cost of the production line itself.

Moreover, even supposing that such a mass of data were recorded, it would assume dimensions such as to be intractable, that is, it would become impossible to gain access to the data of interest within a reasonable time.

SUMMARY OF THE INVENTION

The object of the present invention is to provide a data-collection system which solves all the problems indicated above in a satisfactory manner.

According to the present invention, this object is achieved by virtue of a data-collection system having the characteristics indicated in the claims which follow the present description. A further subject of the invention is the related method.

BRIEF DESCRIPTION OF THE DRAWING

The objects and features of the present invention will become more apparent form the consideration of the following detailed description taken in conjunction with the accompanying drawings in which:

The figure illustrates in block form an automated industrial production line having a data-collection system according to the present invention.

DETAILED DESCRIPTION OF THE PREFERRED EMBODIMENTS

The system according to the present invention has been developed by the Applicant specifically for use in association with a line for the automated production of electronic control units. The principles upon which the invention is based are general, however, and may be applied to any industrial production line whether it be manual or partially or fully automated.

The system according to the invention is particularly useful in all production lines such as, for example, those in the automotive field, in which the quality and reliability of the product are of primary importance, and it is important to be able to reconstruct the production life of the product completely, throughout the course of its life cycle, which may even be quite long, for example, 15 years, for a motor vehicle.

The purpose of the system according to the present invention, therefore, is to achieve a substantial reduction in the quantity of data stored so as to render the system economically feasible and the data retrievable in practice. The main characteristic of the system lies in the fact that it is possible to store only changes in the state of the production line and not elementary data, and that the data can be left independent until there is a precise requirement to associate them and/or organize them by means of a factor common to all the data collected.

Data can thus be associated with the certainty of matching the requirements for their use, even after several years. In the absence of a requirement to associate the data, they remain stored and unused and thus do not take up calculating resources but only minimal memory space. The factor common to all the data stored is the precise time at which the datum arose, the precise time of this event being derived automatically from the clock of the system.

The time is therefore the link between all the data which are collected by the system and which relate, for a finished product, both to the raw materials and to the process. It consequently suffices to reconstruct the time scale in order to find out which batches of raw materials were in use, what the process conditions were, and what were the states of the machines which contributed to the processing of a finished product during its construction in the production line.

Clearly, a system of this type may also be used to implement further functions which, typically, are the monitoring, that is, the checking, of the operating conditions of the production line and the statistical control of the processes.

A system of this type has many purposes; the main purposes are the following:
  to determine the relationships between the quality and reliability of the products by means of:
    an instantaneous knowledge of the process parameters,
    the quality of the materials used for the construction of the finished product,
  to trace the constituents of the product in terms of components and working conditions during the life cycle of the product (several years),
  to know, in real time, the loading of the machines of the production line and the stocks between machines of the production line,
  to know, in real time, all the economic data arising from the use of the production means,
  to help, in real time, to balance the lines in order to maximize the use of resources.

For a better understanding, an industrial production line provided with the system according to the invention will now be described in detail with reference to the drawing.

A typical industrial production line, for example, a line for the production of electronic control units, comprises a series of automatic and/or manual work stations S1, S2, S3, S4, S5, MAN. These stations are normally interconnected by means of a conveyor CONV. The electronic control units are constituted essentially by electronic boards, that is, printed circuits onto which all the electronic components constituting the control unit are soldered.

The printed circuit boards are therefore placed on the conveyor CONV at the input of the production line and thus pass through the various work stations S1, S2, S3, S4, S5, MAN. The work stations comprise, for example: automatic machines for mounting the components, machines for applying resins (used as adhesives), ovens for polymerizing the resins, flow-soldering machines, manual units MAN in which the components which cannot be mounted by automated machines are mounted. Moreover, the production line usually also comprises test equipment TEST (typically disposed at the end of the production line) which, for the purposes of the present invention, is comparable to the other work stations.

The line may also include one or more temporary stores M (sometimes also known as buffers) the purpose of which is to hold a stock of items so as to minimize the effect on the operation of the line of any machine stoppages or imbalances created by the fact that the same operation has different cycle times for different products. At the output OUT of the line, there is usually a packaging station IMB which concludes the line.

The process for the production of an electronic control unit thus starts with the input of a virgin printed circuit at the start of the production line. The printed circuit passes successively through the various work stations and undergoes all the manufacturing steps provided for by the production process until it emerges at the end of the production line in the form of a finished product, that is, a fully assembled and packaged electronic control unit.

Several different types of control unit are normally produced on a modern production line and, for this reason, the printed circuits in the line may undergo different processes in the various work stations, may receive different components, or may possibly be processed in different stations or under different manufacturing conditions in the same station. Moreover, even two identical control units may differ because they receive, for example, components coming from different batches of material, or because there is a change in the operating conditions in the same manufacturing step or work station. These characteristics are also common to most industrial automated production lines currently in use.

It is particularly advantageous to be able to reconstruct fully the entire history of the production process of each control unit output by the production line. To give only one example, if it is found that a certain batch of components is defective, it is very useful to be able to identify, and thus to trace, all the control units on which the components belonging to the defective batch have been mounted. As already stated, however, the cost of storing the full history of the production process for each electronic control unit is, without doubt, prohibitive and not feasible in practice.

The data-collection system according to the present invention, instead, operates differently since it does not store all the data relating to the production process for each individual product or control unit but stores only some data which are organized in a manner such as to permit subsequent complete reconstruction of the production process.

In the system, at the input IN of the production line, each printed circuit receives a label bearing a bar code (or the like, such as a dot-matrix code) which univocally identifies the printed circuit, and hence the electronic control unit, or, more generally, the finished product which will emerge from the output OUT of the production line. In the specific case of electronic control units, for example, when the printed circuit is assembled in the metal container of the control unit, its identification label is applied to the container. The identification in fact relates to the final product of the line and remains unchanged throughout the production process.

This label bearing the identification bar code is applied by means of an automatic labelling station LPRN situated at the beginning of the production line. A bar-code reader LA is also associated with the conveyor CONV at the beginning of the production line and automatically reads the bar codes of the printed circuits entering the production line. The bar-code reader LA disposed at the input of the production line thus detects the input of the printed circuit to the line and communicates it to the central processor MSERV which controls the production line, together with a detection of the precise time, i.e., the hour, minute and second and the date, at which the printed circuit entered the production line.

The printed circuit then passes through the first work station S1 in which it undergoes a first manufacturing step. At the output of the first work station S1, there is another bar-code reader LA which is substantially identical to the first and which detects the output of the printed circuit from the first work station S1. Also the bar-code reader LA disposed at the output of the first station S1 communicates the detection of this event and the precise time associated therewith to the central processor MSERV.

This principle is common to the entire production line. As can be seen from the drawing, each work station S1, S2, S3, S4, S5, MAN, TEST has a pair of bar-code readers LA disposed at its input and at its output. For each work station, the input and the output of the printed circuit are thus detected, together with the precise input and output times.

Clearly, in order for these times to be consistent with one another, the clocks of the bar-code readers LA must be synchronized so that there is a single time or clock setting for the entire production line. This condition is ensured by the central processor MSERV which synchronizes the internal clocks of all the bar-code readers LA periodically by means of a communication network NET.

Typically, the communication network NET is already present in an industrial production line, its purpose being to connect the central processor MSERV to the automated work stations, which, typically, have control computers, or possibly to local processors LSERV which in turn control groups of automated work stations. The network NET in fact serves for the communication of all the data necessary for the normal control of the production line by the central processor MSERV and may be any network in common use, for example, an Ethernet network. Normal devices currently on the market may also be used for the bar-code readers LA and LM, provided that the time can be detected. The station LPRN for printing and applying the labels is also connected, by means of the network NET, to the central processor MSERV which is thus also informed of the input of the printed circuits to the line and can assign them univocal identification codes of the electronic control units which they will constitute.

To summarize the concepts explained hitherto, the central processor MSERV thus stores, for each printed circuit or product, the identification code and all the input and output times to and from each work station, i.e., the times which correspond to the start and finish times of each manufacturing step. The input time to the first work station in practice coincides with the input time of the product to the production line, and in an equivalent manner, the output time from the last station in practice coincides with the time when the product is output from the production line. The data stored for each printed circuit, control unit, or finished product are thus limited to the identification code and a series of times associated with the codes of the manufacturing steps carried out.

The codes and the times of input to and output from the various stations do not necessarily have to be detected by bar-code readers LA. In fact, as already stated, the various automatic work stations S1, S2, S3, S4, S5 are controlled by processors or microprocessors, and possibly also by local processors LSERV, which in turn are connected to the central processor MSERV by means of the communication network NET. Clearly, the various control processors of the work stations can be configured and/or programmed to detect some of the data acquired by the automatic bar-code readers LA.

Typically, these data are the times associated with the manufacturing steps carried out in the various stations. If this option is adopted, a single bar-code reader LA, possibly with an internal clock, associated with each automatic work station may even suffice.

Whatever method is used to detect the data, the principle of the invention, according to which each manufacturing step carried out on a product must give rise to the detection of at least one time associated with the step itself and of an identification code corresponding to the product which has undergone the processing, must in any case be complied with.

As can be seen, the data stored for each product are extremely concise and occupy a very limited space in the storage means HD used by the system. Optical-disc memories HD may advantageously be used for this purpose. These memories HD may be of the write-once type, better known by the abbreviation WORM (write once read many) since the data stored do not need to be modified subsequently. Moreover, this type of memory has the advantage of offering a large capacity at a very low cost and permits quite rapid access to the data.

In the stations in which there is a manual operation, such as, for example, the station MAN in the drawing, some of the data communicated to the central processor MSERV have to be acquired manually, for example, by means of a keyboard or by means of portable or mobile bar-code readers LM. The mobile bar-code readers LM also have internal clocks and, typically, have temporary (buffer) memories which temporarily store the data acquired. The mobile readers LM are periodically placed in suitable supports C, sometimes known in the jargon as inkwells, which, in practice, are communication devices. In fact, the inkwells C enable the mobile readers LM to download the data acquired, re-recording them in the central processor MSERV by means of the network NET. The inkwells C also enable the central processor MSERV periodically to synchronize the internal clocks of the mobile readers LM.

In the case of the manual operations MAN, the operators employed thus communicate the start and finish times of each manual manufacturing step, as well as the code of the product on which the manual step is carried out and the code of the manual step itself, to the central processor MSERV by means of the mobile readers LM or by means of equivalent devices, for example, keyboards, and thus in exactly the same way as the automatic work stations.

This may not take place for the temporary stores M disposed in the line, since there is no manufacturing step corresponding thereto. They do not therefore need to have bar-code readers LA or LM or to be connected to the network NET unless this is necessary for other control requirements of the line. This usually also applies to the packaging station IMB.

The system according to the invention also stores a second set of data. This second set of data relates to the operating conditions and states of the work stations S1, S2, S3, S4, S5, MAN, TEST. The system in fact stores any change in the state of the operating conditions of any work station of the production line. In this case, the changes of state are also stored, together with the precise time, i.e., the time and the date, on which they occur.

A typical change in an operating condition is, for example, the starting of a new batch of components mounted by a work station, caused by the running-out of the previous batch of components. In this case, for example, the operator employed to replace the batch detects the code identifying the batch (which typically is printed on the container of the components as a bar code) by means of a mobile bar-code reader LM and it is thus communicated to the central processor MSERV, together with the time of the replacement. This takes place when the mobile reader LM is placed in its inkwell C exactly as described above.

Other changes of state in the operating conditions of the stations are changes in the temperatures of the ovens or changes of the operative parameters of the soldering machines. Also in this case, the general principle according to which, for each work station, each change of state, together with its time, is communicated by means of readers LM or other equivalent means to the central processor MSERV by means of the network NET is in any case followed. The network NET in fact also enables all this data to be communicated to the central processor MSERV and in the opposite direction, as already stated, to enable the central processor MSERV to synchronize the local clocks of the entire production line.

As already stated, this procedure naturally also applies to any testing stations TEST disposed on the production line. In these stations TEST, which may be either automatic or manual, the start and finish times of each test carried out on each product are thus acquired. Moreover, the result of each test, and possibly the code of any reject detected, is also acquired and then stored. If a rejected product is rectified and/or passes through any station of the line again, these manufacturing steps are also duly recorded in the manner explained hitherto. For various reasons, it may be convenient, for example, at the beginning of a working day or in any case at periodic intervals, to store the entire state of the production line. In fact, if the line does not operate with a continuous cycle, it is necessary to store all the operating conditions again upon restarting operations, since they may have changed. Moreover, as well as being a precautionary measure, this step is also useful in order to reconstruct the operating state of a given station without the need to go back over an unknown period of time to find out all the changes of state which define it.

This second set of data is also stored by the central processor MSERV in the discs HD constituting the archive of the system. Moreover, as can be seen, this second set of data is also quite small since the data are stored in a very concise manner. In order to make the storage and processing of the data quicker and more efficient, a relational database (available commercially) may be used for this purpose.

At this point, the system contains all the data necessary for the complete and detailed reconstruction of the production process of each individual finished product output from the production line. In fact, once a given finished product, the production process of which is to be reconstructed, has been identified, it suffices to communicate its code to a processor which has access to the memories HD and which, by consulting the file relating to the products, can easily recover all the start and finish times of each production step which the finished product in question has undergone. With the start and finish times of each production step available, the processor then consults the file relating to the changes of state of each work station to determine the precise working conditions existing at the moment when the product passed through that particular work station. This recovery method is slightly more complex because, since only the changes of state are recorded, it may be necessary to go back in time, possibly to the start of the working day, to be able to precisely reconstruct the operating conditions of the production step in question. The data can in this case, however, also be recovered safely and efficiently. Upon completion, the production history of the finished product is complete in every detail.

As already stated, the system has the considerable advantage that the data for the production line and for the finished products are stored independently and the two sets of data are correlated only when actually necessary, which eventuality typically occurs only for a fairly small percentage of the finished products output from the production line.

In a currently-preferred embodiment, the system may also be employed to use the elementary data collected in real time both for the optimized (just in time) control of the production line with the use of intelligent programs and to produce a summary of the elementary data for the management of the business, in cooperation with the information system of the business. In fact, the system can make the non-structured elementary data available to all the offices of the business with the facility for particular applications to be requested without losing basic data.

The system can also cooperate, in real time, with some processors SPC which are sometimes present in the production line for the statistical control of the processes. The function of these processors SPC is to monitor the production line in real time for quality-control purposes. These processors SPC collect and process a series of data relating to quality, mainly the results of tests carried out in the test equipment TEST, and interact with the operatives and technicians employed on the production line. The function of the processors SPC is in fact to oversee the operating conditions of the various work stations, at the same time generating static analysis of the processes carried out therein and, when necessary, supplying the personnel employed with data and/or warnings, possibly in advance, if situations occur which require the intervention of the personnel.

Naturally, the processors SPC are connected to the central processor MSERV by means of the communication network NET and are also connected directly to the automatic work and testing stations with which they are associated. If the production line is provided with the system according to the invention, it is particularly advantageous for the processors SPC to have access to the data collected and processed by the system in real time so as to be able to perform their functions in an optimal manner.

Naturally, the principle of the invention remaining the same, the details of construction and forms of embodiment may be varied widely with respect to those described and illustrated, without thereby departing from the scope of the present invention.

What is claimed is:

1. A system for recording data relating to production conditions and a production process for an article produced on a production line, said production line having an input and an output and a plurality of work stations, said system comprising:

central processing means,
   memory means associated with said central processing means,
   communication means connecting the work stations and said central processing means to one another,
   time measuring devices in the production line for making time measurements for said work stations,
   means for associating with each article a mark bearing an identification code which can be detected by instruments at the input of the production line,
   means for detecting and communicating to said central processing means, when the article, is input to and/or output from at least some of the work stations of the production line, the identification code associated with the article, a datum indicative of a manufacturing step carried out in the work station, and a datum indicative of the time at which the code is detected as measured by a time measuring device,
   means for detecting and communicating to the central processing means, for at least some of the work stations of the line, changes of state in operating conditions of the station and a datum indicative of the time at which the change of state of the operating condition of the station occurred as measured by a time measuring device,
   wherein said central processing means is configured to store the identification codes, the changes of state, and the data in said memory means in order to be able to formulate a full reconstruction of the entire history of the production process of each article output by said production line by determining the operating conditions existing when said each article passed through each work station on the basis of the times at which the identification code of the article has been detected and the changes of state that occurred for each of said at least some of the work stations.

2. A system according to claim 1, wherein said means for associating with each article a mark further comprises a station for printing a label bearing the identification code and for applying the label to the article.

3. A system according to claim 2, wherein the identification code is printed on the label as a bar code.

4. A system according to claim 3, wherein said means for detecting and communicating to said central processing means the identification code are associated with all the work stations of the line.

5. A system according to claim 4, wherein the datum indicative of the time at which the code is detected comprises a datum indicative of the date and a datum indicative of the time at which the detection takes place.

6. A system according to claim 4, wherein the datum indicative of the manufacturing step carried out comprises a datum indicative of the work station in which the manufacturing step was carried out.

7. A system according to claim 6, wherein the datum indicative of the manufacturing step carried out comprises a datum indicative of a specific operation carried out in the manufacturing step.

8. A system according to claim 6 wherein the work stations comprise testing stations and wherein the datum indicative of the manufacturing step carried out comprises a datum indicative of a result of the manufacturing step.

9. A system according to claim 8, wherein the means for detecting and communicating to the central processing means the changes of state are associated with all the work stations of the line.

10. A system according to claim 9, wherein the datum indicative of the time at which the changes of state occur comprises a datum indicative of the date and a datum indicative of the time at which the changes of state occur.

11. A system according to claim 9, wherein the means for detecting and communicating to the central processing means the changes of state are configured to detect and communicate changes of state selected from the group consisting of:

changes in a batch of components and/or materials used in the work stations, changes in control programs of the work stations, changes in operating parameters of the work stations, changes in test programs of the work stations, changes in tools used in the work stations, changes in environmental conditions relating to the work stations, and changes in personnel employed in the work stations.

12. A system according to claim 11, wherein the means for detecting and communicating to the central processing means the changes of state are configured to detect and communicate all the changes of state.

13. A system according to claim 3, wherein the means for detecting and communicating to said central processing means the identification codes comprise automatic bar-code readers.

14. A system according to claim 1, wherein the identification code is different for each article passing along the line.

15. A system according to claim 1, wherein the means for detecting and communicating to said central processing means the changes of state comprise bar-code readers.

16. A system according to claim 1, wherein said central processing means is adapted and configured to synchronize periodically all the time-measurement devices included in the line.

17. A method of recording data relating to production conditions and a production process of an article produced on a production line having an input and an output and a plurality of work stations, said method comprising the following steps:

associating with each article a mark bearing an identification code which can be detected instrumentally at the input of the line, providing a time measurement by time measurement devices for at least some of said work stations of the line detecting and recording on memory means, when the article is input to and/or output from at least some of the stations of the line, the identification code associated with the article, a datum indicative of a manufacturing step carried out in the station, and a datum indicative of the time at which the code is detected, detecting and recording on the memory means, for said at least some stations of the line, changes of state in operating conditions of the station and a datum indicative of the time at which the change of state of operating condition of the station occurred, and determining from said memory means the operating conditions existing when each article passed through each one of said at least some of the work stations in order to formulate a full reconstruction of the entire history of the production process of said each article output by said production line on the basis of the times at which the identification of the article has been detected and the changes of state that occurred for each of said at least some of the work stations in the line.

18. A method according to claim 17, wherein the step of associating with each article a mark further comprises the steps of producing a label bearing the identification code and applying the label to the article.

19. A method according to claim 18, wherein the code is printed on the label as a bar code.

20. A method according to claim 19, wherein the step of detecting and recording on memory means the code occurs for all the work stations of the line.

21. A method according to claim 20, wherein the datum indicative of the time at which the code is detected comprises a datum indicative of the date and a datum indicative of the time at which the detection takes place.

22. A method according to claim 20, wherein the datum indicative of the manufacturing step carried out comprises a datum indicative of the work station in which the manufacturing step was carried out.

23. A method according to claim 22, wherein the datum indicative of the manufacturing step carried out comprises a datum indicative of a specific operation carried out in the manufacturing step.

24. A method according to claim 22, wherein the manufacturing steps comprise testing steps, and the datum indicative of the manufacturing step carried out comprises a datum indicative of a result of the manufacturing step.

25. A method according to claim 24, wherein the step of detecting and recording on memory means the changes of state occurs for all the work stations of the line.

26. A method according to claim 25, wherein the datum indicative of the time at which the changes of state occur comprises a datum indicative of the date and a datum indicative of time at which the changes of state occurred.

27. A method according to claim 25, wherein the step of detecting and recording on memory means the changes of state occurs for changes of state selected from the group consisting of:

changes a batch of components and/or materials used in the work stations, changes in control programs of the work stations, changes in operating parameters of the work stations, changes in test programs of the work stations, changes in tools used in the work stations, changes in environmental conditions relating to the work stations, changes in personnel employed in the work stations.

28. A method according to claim 27, wherein the step of detecting and recording on memory means the changes of state occurs for all the changes of state.

29. A method according to claim 19, wherein the codes are detected by means of automatic bar-code readers.

30. A method according to claim 17, wherein the identification code is different for each article passing along the line.

31. A method according to claim 17, wherein some of the changes of state are detected by the reading of bar codes.

32. A method according to claim 17, wherein the line comprises a processing and communication system, and wherein the method comprises the steps of communicating and detecting the codes and the changes of state by means of a communication system.

33. A method according to claim 17, further comprising the step of periodically synchronizing all time-measurement devices included in the line.

34. A system for recording data relating to production conditions and a production process for an article produced on a production line, said production line having an input and an output and a plurality of work stations, said system comprising:

time measurement devices in the line for measuring the time in at least some of the work stations, central processing means including synchronizing means for time synchronization of said time measurement devices, memory means associated with said central processing means, communication means connecting the work stations and said central processing means to one another, means for associating with each article a mark bearing an identification code which can be detected by instruments at the input of the production line, means for detecting and communicating to said central processing means, when the article is input to and/or output from said at least some of the work stations of the production line, the identification code associated with the article, a datum indicative of a manufacturing step carried out in the work station, and a datum indicative of the time at which the code is detected as measured by said time measuring devices, means for detecting and communicating to the central processing means, for said at least some of the work stations of the line, changes of state in operating conditions of the station and a datum indicative of the time at which the change of state of the operating condition of the station occurred as measured by said time measuring devices, wherein said central processing means is configured to store the identification codes, the changes of state, and the data in said memory means and wherein said central processing means is adapted and configured to cause said synchronizing means to synchronize periodically all the time measurement devices included in the line.

\* \* \* \* \*